(12) United States Patent
Jalali et al.

(10) Patent No.: US 9,998,859 B2
(45) Date of Patent: Jun. 12, 2018

(54) SYSTEMS AND METHODS OF LOCATION AND TRACKING

(71) Applicant: Bridgewest Finance LLC, San Diego, CA (US)

(72) Inventors: Ahmad Jalali, Rancho Santa Fe, CA (US); Dhinakar Randakrishnan, San Diego, CA (US); Mehran Baghaei, San Diego, CA (US)

(73) Assignee: Bridgewest Finance LLC, San Diego, CA (US)

( * ) Notice: Subject to any disclaimer, the term of this patent is extended or adjusted under 35 U.S.C. 154(b) by 340 days.

(21) Appl. No.: 14/797,875

(22) Filed: Jul. 13, 2015

(65) Prior Publication Data

US 2015/0319572 A1    Nov. 5, 2015

Related U.S. Application Data

(63) Continuation-in-part of application No. PCT/US2015/017423, filed on Feb. 25, 2015, and a
(Continued)

(51) Int. Cl.
*G01S 3/02* (2006.01)
*H04W 4/02* (2018.01)
(Continued)

(52) U.S. Cl.
CPC ............... *H04W 4/021* (2013.01); *G01S 5/14* (2013.01); *G06K 7/10009* (2013.01);
(Continued)

(58) Field of Classification Search
CPC .. G01S 5/00; G01S 5/14; G01S 13/74; H04W 4/02; H04W 4/021; H04W 64/00; G07C 9/00111; G06K 7/10009
(Continued)

(56) References Cited

U.S. PATENT DOCUMENTS 5,774,876 A    6/1998    Woolley et al.
6,917,290 B2   7/2005    Land
(Continued)

*Primary Examiner* — Chuong P Nguyen
(74) *Attorney, Agent, or Firm* — Klein, O'Neill & Singh, LLP

(57) ABSTRACT

A position location system is described for determining position of mobile Tags attached to assets or people. Zone Tags are installed in the venue to assist in position location estimation of mobile Tags. Time is divided into intervals, each interval comprising at least one range measurement sub-interval, and an idle sub-interval where zone Tags and mobile Tags go to sleep to save power. A zone Tag or mobile Tag is designated as the anchor network element. The anchor network element contends and seizes the communications channel at the beginning of each interval to start the range measurement phase. Mobile Tag position location estimates are made periodically. Between the periodic range measurement based position estimates, mobile Tag sensor readings are used to update the mobile Tag's position location. The period between range measurement based position updates is adjusted based on the statistics of the differences between the range measurements based position estimate and the sensor based position updated.

10 Claims, 8 Drawing Sheets

Related U.S. Application Data continuation-in-part of application No. 14/284,384, filed on May 21, 2014, now Pat. No. 9,784,816.

(60) Provisional application No. 61/944,115, filed on Feb. 25, 2014.

(51) Int. Cl.

| | |
|---|---|
| *G06K 7/10* | (2006.01) |
| *G01S 5/14* | (2006.01) |
| *H04W 84/12* | (2009.01) |
| *G07C 9/00* | (2006.01) |
| *G01S 13/74* | (2006.01) |

(52) U.S. Cl.
CPC ........... *G01S 13/74* (2013.01); *G07C 9/00111* (2013.01); *H04W 84/12* (2013.01); *Y02B 60/50* (2013.01)

(58) Field of Classification Search
USPC .............................. 342/451, 464; 340/539.13
See application file for complete search history.

(56) References Cited

U.S. PATENT DOCUMENTS

| | | | |
|---|---|---|---|
| 7,092,943 B2* | 8/2006 | Roese | G01S 5/02 |
| 7,228,228 B2 | 6/2007 | Bartlett | |
| 7,558,852 B2 | 7/2009 | Douglas | |
| 8,219,094 B2 | 7/2012 | Huber | |
| 8,253,538 B1 | 8/2012 | Chu | |
| 8,294,554 B2 | 10/2012 | Shoarinejad | |
| 8,344,949 B2 | 1/2013 | Moshfeghi | |
| 8,565,133 B2 | 10/2013 | Chen | |
| 8,611,321 B2* | 12/2013 | Herrala | G01S 1/68 370/338 |
| 9,113,343 B2 | 8/2015 | Moshfeghi | |
| 9,404,996 B2 | 8/2016 | Yamada | |
| 9,551,775 B2 | 1/2017 | Rangarajan et al. | |
| 2004/0027251 A1 | 2/2004 | Sharony | |
| 2007/0103303 A1 | 5/2007 | Shoarinejad | |
| 2008/0150695 A1 | 6/2008 | Batra | |
| 2009/0121867 A1 | 5/2009 | Park | |
| 2010/0073235 A1 | 3/2010 | Smith | |
| 2010/0074133 A1 | 3/2010 | Kim | |
| 2010/0135178 A1* | 6/2010 | Aggarwal | G01S 5/0205 370/252 |
| 2011/0128148 A1 | 6/2011 | Nierenberg et al. | |
| 2012/0113902 A1 | 5/2012 | Shoarinejad | |
| 2015/0156746 A1* | 6/2015 | Horne | G01S 5/0205 455/456.6 |
| 2015/0241551 A1* | 8/2015 | Jalali | G06K 7/10009 342/451 |
| 2015/0271643 A1 | 9/2015 | Jalali | |
| 2015/0304810 A1* | 10/2015 | Jalali | H04W 4/02 370/336 |
| 2015/0319572 A1 | 11/2015 | Jalali | |
| 2016/0054429 A1* | 2/2016 | Jalali | G01S 5/0294 342/451 |
| 2017/0041763 A1 | 2/2017 | Jalali | |

* cited by examiner

SYSTEMS AND METHODS OF LOCATION AND TRACKING

RELATED APPLICATIONS

This application claims priority to PCT Patent Application No. PCT/US15/017423 entitled "Systems and Methods of Location and Tracking" filed Feb. 25, 2015, which application claims priority to U.S. Non-provisional patent application Ser. No. 14/284,384, entitled: "Systems and Methods of Location and Tracking" filed May 21, 2014 and to U.S. Provisional Application Ser. No. 61/944,115, filed Feb. 25, 2014 and entitled: "Systems and Methods of Location and Tracking", the contents of each which are incorporated by reference in their entirety.

FIELD

The invention generally relates to location and tracking systems and methods and more specifically to system and methods for tracking the physical position of assets.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

A number of systems have been developed and deployed to locate and track the position of people and assets collectively ("assets") in local area environments such as office buildings, hospitals, shopping malls, and hotels, industrial environments such as refineries, oil rigs, and manufacturing facilities. Many of these systems, however, provide position accuracy of within a few meters using an existing Wi-Fi or Bluetooth network.

Position location accuracy of a few meters may suffice in some applications such as locating a tool in an industrial environment such as in a refinery, in an aircraft hangar etc. In some applications, however, accuracy of less than one meter is required. Many of the applications requiring high position location precision involve establishing close association of two assets (e.g. two persons, a person and some equipment or two pieces of equipment. In many cases, it is not necessary that the precise location of a person or object (i.e. asset) to be known, but rather the association of the two is needed which requires determining that an asset is in the proximity of another asset. For instance, hospitals would like to record if a doctor or a nurse has visited a certain patient during the day. In this application, what is important is to record that the doctor/nurse was in proximity of the patient at certain time. The position location accuracy requirement for this case is often referred to as "room level" accuracy meaning that the doctor/nurse must be located in the right room. However, as mentioned above if the objective is to ensure that the doctor/nurse visited the patient during the day, then it is really detecting the close proximity of the doctor/nurse and the particular patient that is needed and not necessarily accurately locating the doctor/nurse. In rooms with multiple beds, the doctor/nurse must be associated with the right patient in that room. Another example of room level accuracy is in hotels where it is desirable to locate a maid in the right room in case there is an emergency, or to be able to verify that someone has cleaned a specific room.

One manufacturing use case is to adjust the torque of a wrench depending on the specific manufacturing part the tool is trying to fasten. This again is a case of detecting proximity of the tool and a manufacturing part. Another example of the need to detect proximity is to ensure that certain medical equipment such as an IV pump is in fact attached to a certain patient. Another example is to register that doctors/nurses have washed their hands prior to certain functions such as visiting a patient. This application again requires detection of close proximity of the doctor/nurse and a sink/disinfectant station.

Another application for accurate position location in retail environment is to direct the customer to the right location in the store for a given item. Here one would want a very accurate positioning scheme to navigate the customer through the store so that the customer gets very close to the item he/she is searching.

SUMMARY

In one embodiment principles of the present disclosure provide a position location determination system having mobile tags and zone tags comprising a first network comprising at least one Access Point (AP) network element, each AP creating a coverage area referred to as a Basic Service Set (BSS), configuring other network elements in its BSS, and providing access to the internet to network elements in its BSS, a second network of zone tag network elements underlying the first network capable of making range measurements with mobile tags, time being divided into range-measurement-period intervals, each interval comprising a measurement period when tags make range measurements, followed by a sleep period where tags are sleep to save power, network elements waking up at the beginning of range-measurement-period, and an anchor network element contends for the channel and seizes the channel, mobile and zone tag tags making range measurements according to a schedule and the range measurements are used by triangulation algorithms to estimate the mobile tag position location.

In one embodiment principles of the present disclosure provide A process for determining relative location of assets within a transmission zone of a wireless network comprising the steps of providing at least one zone tag for placement within said transmission zone at a known position, said zone tag having a wireless transceiver configured to communication over said wireless network, and receiving said position of said zone tag within said transmission zone; providing at least one mobile tag, for securing to an asset within said transmission zone, said mobile tag having a wireless transceiver configured to communication over said wireless network; associating each said mobile tag with at least one of said zone tag, said zone tag within transmission range of said mobile tag; said zone tags periodically receiving mobile tag communication; determining relative position of said mobile tag as a function of zone tag to mobile tag communication time.

BRIEF DESCRIPTION OF THE DRAWINGS

Following drawings in conjunction with detailed description help clarify the features and advantages of the present disclosure. In the figures, similar components are identified using the same reference label. Multiple instances of the same component in a figure are distinguished by inserting a dash after the reference label and adding a second reference label.

DETAILED DESCRIPTION

Figure 1:
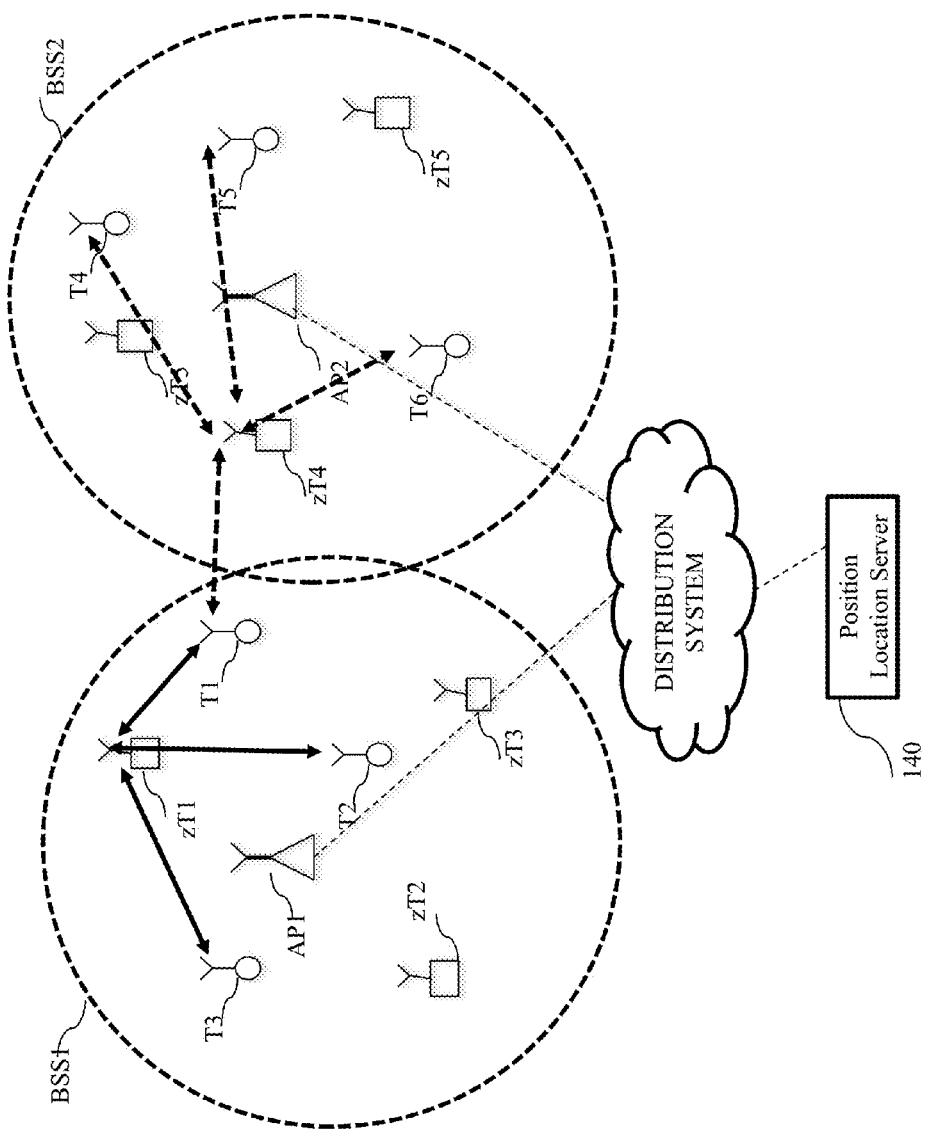
FIG. 1 is an exemplary diagram of elements of a position location system.

The Figures and text below, and the various embodiments used to describe the principles of the present invention are by way of illustration only and are not to be construed in any way to limit the scope of the invention. A Person Having Ordinary Skill in the Art (PHOSITA) will readily recognize that the principles of the present invention may be implemented in any type of suitably arranged device or system. Specifically, while the present invention is described with respect to use in Wi-Fi networks and Access Points therein, a PHOSITA will readily recognize other types of networks and other applications without departing from the scope of the present invention.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by a PHOSITA to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

The indoor position location system complements an existing IEEE 802.11 wireless local area network (WLAN) network to provide high precision indoor position location information for mobile tags secured to generally immobile assets, such as equipment or mobile assets such as cellular telephones.

FIG. 1 shows a typical IEEE 802.11 network deployment. Access Points (APs) are labeled as APi, where i is an integer identifying different APs. There are multiple IEEE 802.11 APs designated as AP1, AP2, etc. Each of the APs form a Basic Service Set (BSS), which is identified by a unique BSSID, or a local monitoring zone. The BSSs are typically interconnected to form an Extended Service Set (ESS) or extended monitoring zone, and share the same security credentials thereby facilitating easy movement of WiFi devices between different BSSs. FIG. 1 shows a sample IEEE 802.11 network with 2 BSSs, each of the BSSs has one AP. The BSSs can optionally be linked to form an ESS. Note that the different BSSs, such as for instance the adjacent BSSs, may be operating on different frequency channels to minimize interference between BSSs.

APs are the wireless network WiFi elements that may already have been installed for internet access in a given building or campus that usually connect to a wired network. In addition to APs, a number of auxiliary APs referred to as zone tags, labeled as zTi, where i is an integer identifying different zone tags, are also installed in the venue. The zone tags are disposed at known positions within the local monitoring zone, which is defined the transmission distance of the APs. The reason for use of the term zone tags is that these are IEEE 802.11 capable devices, capable of being network nodes or passively analyzing the network traffic, which are installed on walls or ceilings and cover a certain "zone" in the venue. Zone tags have similar capability as the WiFi APs do, and provide range measurements with mobile tags to determine the mobile tags' position location. In other words, zone tags complement the APs in the legacy WiFi network in a given venue. Zone tags may provide the same functionality as the IEEE 802.11 APs or IEEE 802.11 Stations (STAs), but whose primary function is radio frequency communication with the mobile tags in order to provide range measurement data. In fact, in a venue where there is no legacy WiFi network, then some of the zone tags will be configured to act as APs.

Referring to FIG. 1, in addition to APs, the system includes a number of auxiliary zone tags zT1, zT2 etc. As mentioned above, mobile tags are WiFi enabled devices secured to assets, and are capable of communicating with the APs and zone tags via radio frequency. Mobile tags are labeled by Tj, where j is an integer and denotes occurrences of mobile tags. The position location server 140 schedules Round Trip Delay (RTD) or Time Of Arrival (TOA) measurements between mobile tags and multiple zone tags, and carries out triangulation using the RTD or TOA measured values to determine the position of the mobile tag, and sends the computed position location to other parts of the network (not shown in FIG. 1).

In certain configurations, in order to save power, zone tags and mobile tags go into sleep mode, and wake up at certain time instants specified by the position location server to carry out RTD or TOA measurements with the mobile tags. Note that the task of the position location server may be located in other network elements, or even be distributed among network elements. It is assumed that the frame timing of the zone tags and the mobile tags are aligned so that the mobile and zone tags may wake up at approximately the same frame boundaries scheduled by the position location server. The position location server assigns mobile tags to carry out RTD/TOA measurements with a subset of zone tags whose signals the mobile tag can detect. As mentioned above, mobile and zone tags are in sleep mode when they are not making range measurements, and wake up at certain time instants scheduled by the position location server. When a zone tag wakes up, it must first contend with other devices on the network to seize the communications channel. Once a zone tag has seized the channel, it needs to hold on to the channel until it has made range measurements with all mobiles in its coverage, and then pass the channel to other zone tags in the given BSS.

In the IEEE 802.11 protocol, devices measure the signal strength on the communications channel, and if the measured signal strength is above a threshold, the devices decide that the channel is occupied and go into channel monitoring mode. When in channel monitoring mode, devices only begin transmitting if the channel has become idle for a time interval of DIFS (DCF Inter-Frame Space) plus a random backoff time interval. Note that the channel is determined to be idle if the measured signal strength on the channel is below a threshold. The random backoff time interval is chosen randomly by each device that is contending for the channel, and is designed to avoid collision among the multiple devices that may be simultaneously contending for the channel. In IEEE 802.11, there is also a Short Inter-Frame Space (SIFS), which is defined as a shorter time period than DIFS. SIFS is the time interval between receiving a Data frame and sending back an Ack frame. When a pair of IEEE 802.11 devices/APs are exchanging data, they wait a time interval of SIFS between receiving a packet and transmitting/responding with a packet such as an acknowledgment. Since SIFS is shorter than DIFS, and contending devices wait at least a DIFS interval before attempting to transmit, the device/AP pair that currently occupy the channel prevent other devices in the network from attempting to seize the channel, by using SIFS time interval between their transmissions. Therefore, once the zone tags seize the channel to make range measurements with mobile tags, the zone tags may hold on to the channel by spacing their transmissions by a SIFS or shorter time interval so that other devices do not attempt to access the channel. In certain configurations, the range-measurement-period is defined as the period during which the zone tags in a given BSS first contend and seize the communications channel, sequentially make range measurements with the scheduled mobile tags in that BSS and certain mobile tags in adjacent BSSs, and then relinquish the channel and go in sleep period. Therefore, the range-measurement-period consists of three intervals of: contending for the channel; carrying out range measurements; and going to sleep.

Some of the embodiments that are described in this disclosure, use the technique of only waiting a SIFS or a shorter time interval between transmissions in order to avoid ceding the channel to other devices; until zone tags have made all scheduled range measurements with the mobile tags for the given range-measurement-period. Moreover, when zone tags and mobile tags wake up to begin the range-measurement-period, zone tags may seize the channel more quickly by only waiting a time interval with duration between SIFS and DIFS, or even a time interval less than SIFS, once the channel becomes idle. Note that since other devices will wait DIFS plus a random time interval before attempting to transmit, then a zone tag that only waits a time interval between SIFS and DIFS will preempt other contending devices from seizing the channel, and will get access to the channel first.

Figure 2:
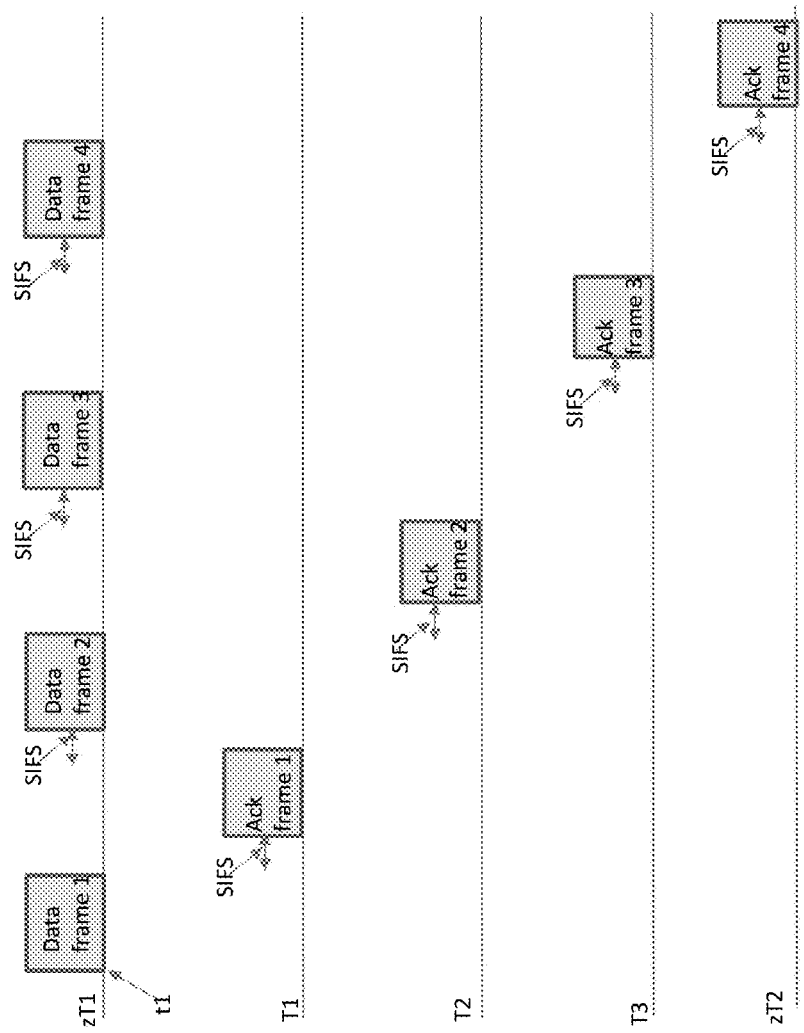
FIG. 2 is an exemplary temporal time line of round trip delay measurements between mobile and zone tags according to an embodiment of the current invention.

An embodiment whereby zone tags seize the channel and make RTD measurements with the mobile tags is described next using FIG. 1 and FIG. 2 as illustrations. In the example of FIG. 1, there are three mobile tags T1, T2 and T3 in BSS1 with which zT1 needs to make RTD measurements. Each zone tag has a mobile-tag-measurement-list that includes all mobile tags with which a given zone tag makes range measurements. The three tags T1, T2 and T3 are in the mobile-tag-measurement-list of zone tags zT1, zT2 and zT3. FIG. 2 illustrates an exemplary temporal diagram, showing the time sequence when the zone tag zT1 seizes the channel, and makes RTD measurements with mobile tags T1, T2 and T3 in its mobile-tag-measurement-list. Zone tag zT1 seizes the channel, and sends Data frame 1 to mobile tag T1 at time TOD1. Mobile tag T1 sends an Acknowledgement (Ack) frame back to zT1 a SIFS (Short Inter-Frame Space) time after receiving Data frame 1. Once zT1 has received Ack frame 1 from T1, it can estimate the RTD from zT1 to T1. zT1 after a time interval of length SIFS or shorter upon receiving an Ack frame from T1, sends a Data frame 2 to T2. T2 in turn responds with Ack frame SIFS time interval after receiving Data frame 2. zT1 repeats the same Data/Ack frame sequence to measure RTD with T3. Note that as described previously in this disclosure, zone tag zT1 sends Data and Ack packets spaced at SIFS or shorter time interval in order to prevent other devices in the BSS from contending for the channel. Once zT1 has completed RTD measurements with all mobile tags in BSS1, then zT1 may send a Data frame to zT2, using SIFS as inter-frame time spacing, to allow zT2 to seize the channel before other devices in the network may contend for the channel. Similarly, zone tag zT2 carries out RTD/TOA range measurements with mobile tags T1, T2 and T3 in BSS1, and transfers control of the channel to zone tag zT3 by sending a Data frame to zT2 using SIFS as inter-frame time interval. In the above description, SIFS was used as inter-frame time interval by zone tags to prevent other devices from contending for the channel. However, as was described previously any inter-frame time interval that is smaller than DIFS would also be effective. Therefore, SIFS is just one example of inter-frame time interval that prevents other devices from contending for the channel.

Figure 5:
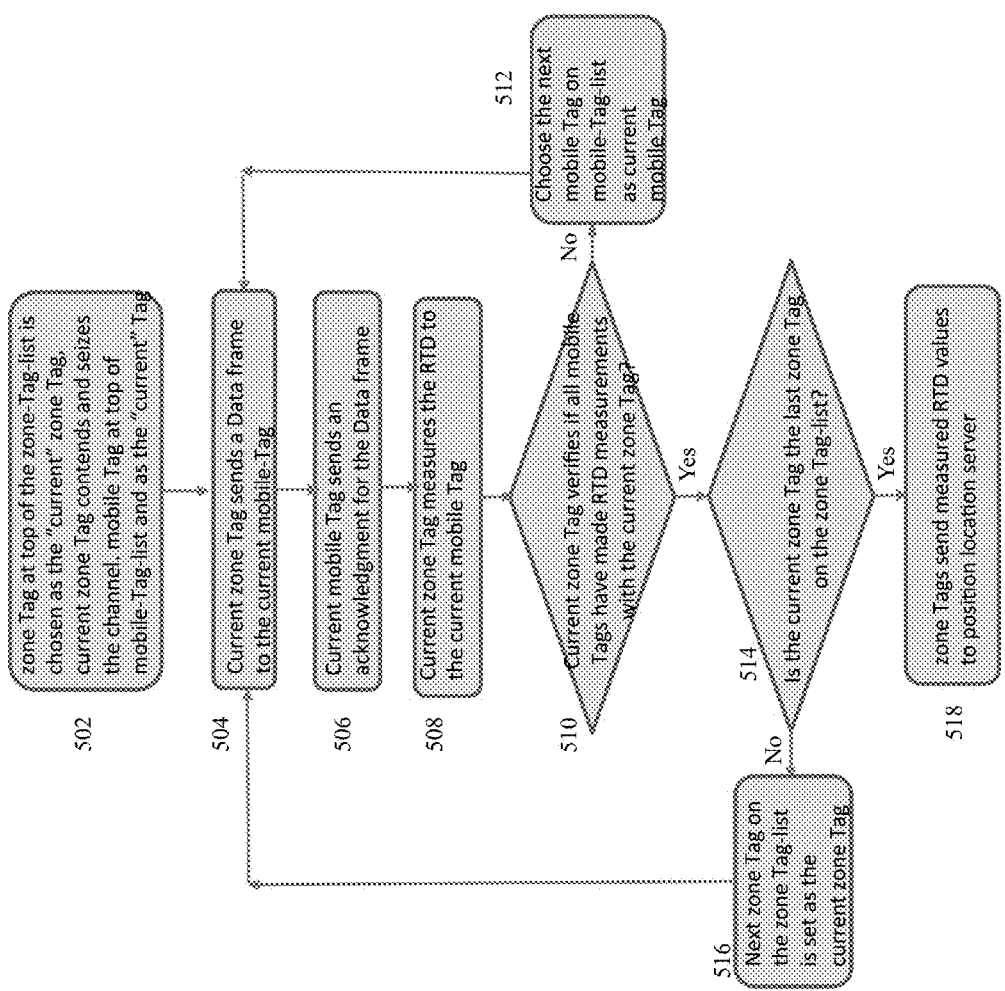
FIG. 5 is an exemplary flow chart of round trip delay measurements between mobile and zone tags according to an embodiment of the current invention.

A zone-tag-list, also referred to as a zone tag directory, is the list of zone tags in a BSS that need to make range measurements with mobile tags. A mobile-tag-list, also referred to as a mobile tag directory, is the list of mobile tags that need to make range measurements with zone tags of a BSS. That is to say mobile tags within a BSS are associated with one or more zone tags. FIG. 5 is an exemplary flow chart of an embodiment used to make RTD measurement between zone tags and mobile tags. The process iterates through each of the zone tags in the zone tag list. The zone tag in the zone-tag-list in the BSS is chosen as the "current" zone tag. In step 502: the current zone tag contends for the channel, and seizes the channel at the beginning of the range-measurement-period; and the mobile tag at the top of the mobile-tag-list is currently designated as the current mobile tag. The current zone tag is the one that starts RTD measurements with mobile tags. In step 504, the current zone tag sends a data frame to the current mobile tag. In step 506, the current mobile tag responds to the Data frame with an Acknowledgement frame. In step 508, the current zone tag estimates RTD to the current mobile tag using the TOD (Time Of Departure) of Data frame from current zone tag and the TOA of Acknowledgement frame at the current zone tag. In step 510, the current zone tag verifies if all associated mobile tags on the mobile-tag-list have made RTD measurements with current zone tag; if not the next mobile tag on the mobile-tag-list is chosen as the current mobile tag in step 512 and the process goes back to step 504. If all mobile tags have made RTD measurements with the current zone tag, then in step 514 the current zone tag determines if it is the last zone tag on the zone tag-list; if not, then in step 516 the next zone tag on the zone-tag-list is set as the current zone tag and the process moves to step 504. If the current zone tag is the last zone tag on the zone-tag-list, then the process moves to step 518 where zone tags send their RTD measurements to the position location server.

As shown in FIG. 1, zone tag zT4 that is associated with BSS2 is also close enough to mobile tag T1 of BSS1 to be able to make RTD measurement with T1. As shown with dashed arrow lines in FIG. 1, zT4 is assigned by the position location server to make range measurements with mobile tag T1 in BSS1 and mobile tags T4, T5 and T6 in BSS2. In other words the mobile-tag-measurement-list of zT4 contains three tags in BSS2 and one tag in BSS1. Therefore, mobile tags that are in close proximity of zone tags of multiple BSSs may be in the mobile-tag-measurement-list of zone tags that are associated with different BSSs; these mobile tags will need to wake up during the range-measurement-interval of each of the corresponding BSSs.

Figure 3:
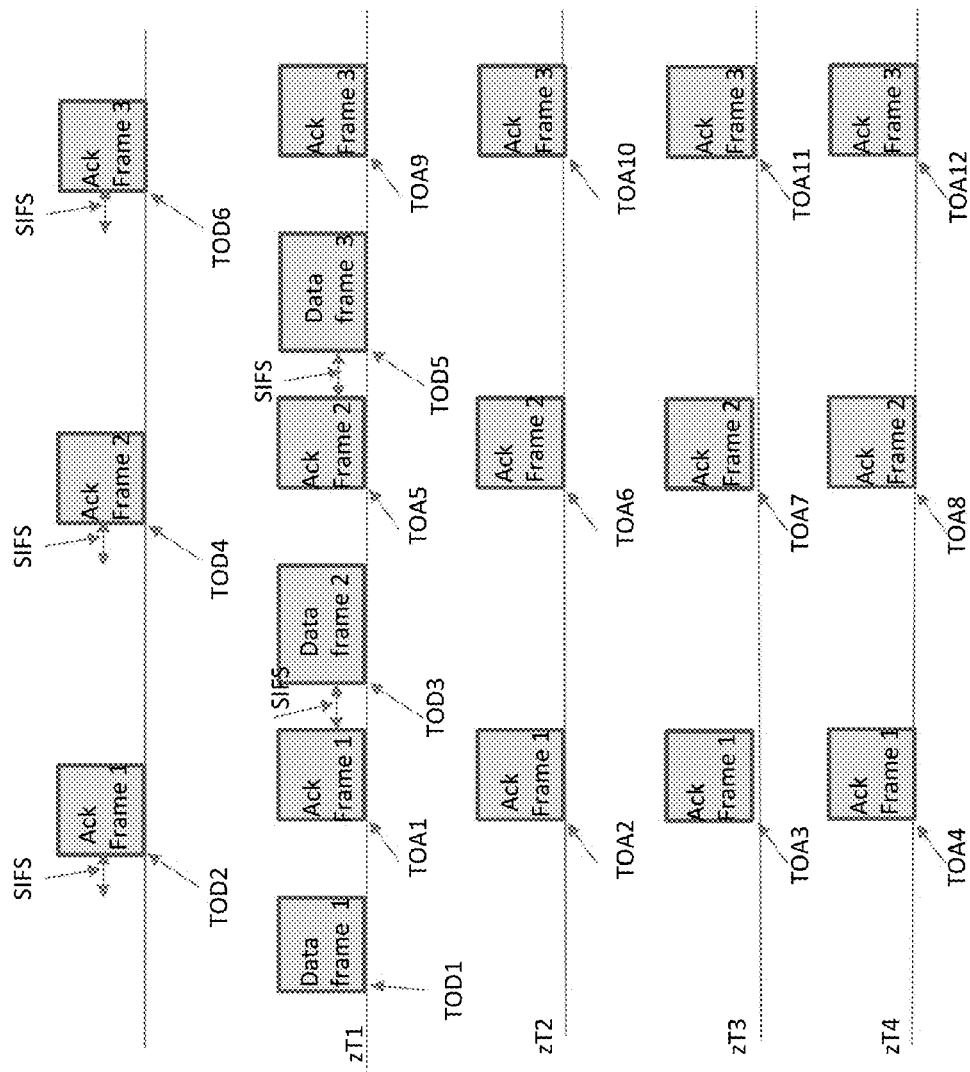
FIG. 3 is an exemplary temporal time line of time of arrival measurements between mobile and zone tags according to an alternate embodiment of the current invention.

Now disclosing an alternate embodiment, FIG. 3 is a temporal illustration of packet exchanges between mobile tags and zone tags whereby at least two distal zone tags measure TOA of packets transmitted by each mobile tags. In this embodiment, one zone tag in the BSS, zT1 in the example of FIG. 3, is chosen as the anchor zone tag to control the sequence of TOA measurements as described next. Zone tag zT1 contends for the channel at the beginning of the range-measurement-period, and after seizing the channel, initiates TOA measurement with mobile tag T1. At time TOD1, zT1 sends a Data frame 1 to mobile tag T1, where TOD stands for Time of Departure in this disclosure. Mobile tag T1, following reception of Data frame 1 and after a time interval of SIFS, sends Ack frame 1, encoding a packet frame identifier therein in exemplary configuration. Zone tags zT1, zT2, zT3 and zT4 receive Ack frame 1 at times TOA1, TOA2, TOA3 and TOA4, where TOA stands for Time OF Arrival. Zone tag zT1 after a SIFS time duration following reception of Ack frame 1, at time TOD2 sends a Data frame 2 destined for mobile tag T2. Mobile tag T2 sends an Ack frame 2 in response to Data frame 2. All zone tags measure the TOA of Ack frame 2 (TOA5, TOA6, TOA7, and TOA8). This process is repeated for mobile tag 3. All zone tags send the measured TOA values from all mobile tags to the position location server for triangulation to determine the position of the mobile tags. In exemplary configuration, the position location server employs the packet identifier and time window for grouping frames for TOA calculation. Note that, instead of zone tag zT1, the task of sending Data frame to the mobile tags may be alternatively taken up by the AP of the BSS.

Figure 6:
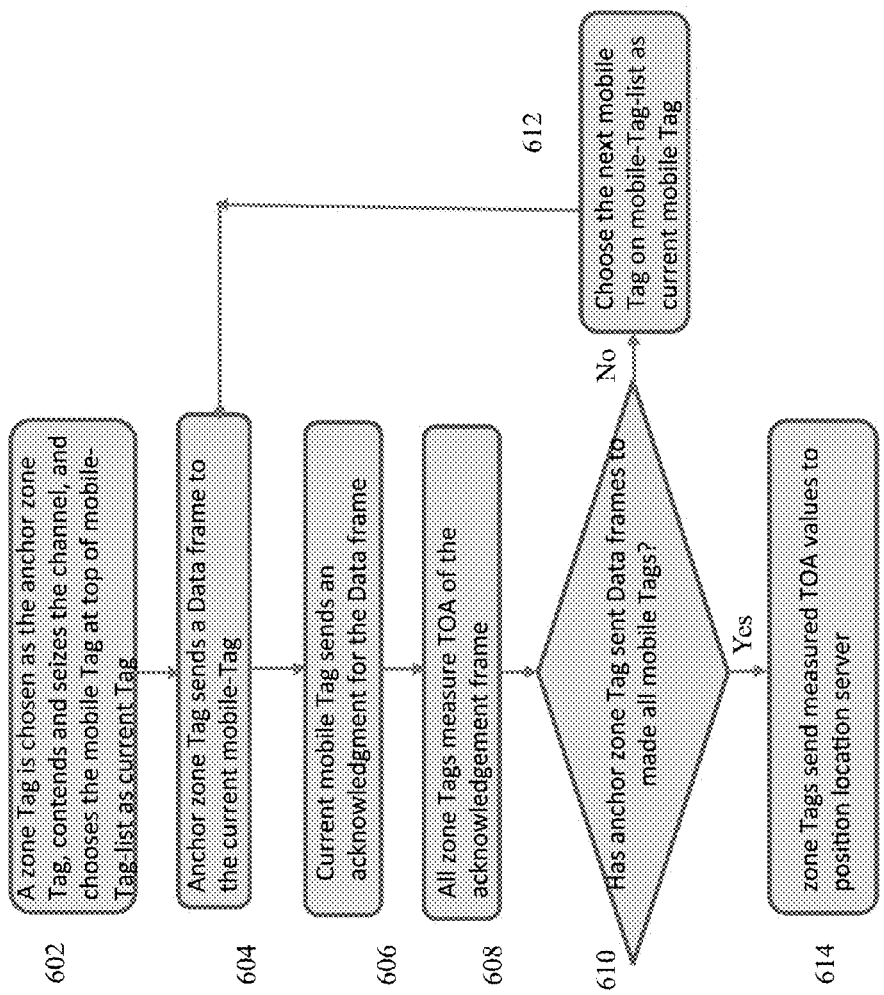
FIG. 6 is an exemplary flow chart of time of arrival measurements between mobile and zone tags according to an embodiment of the current invention.

FIG. 6 is an exemplary flow chart of an embodiment used by zone tags to make TOA measurements on the received Acknowledgement frames from the mobile tags. In step 602: a zone tag is chosen as the anchor zone tag; anchor zone tag contends for and seizes the channel at the beginning of the range-measurement-period; anchor zone tag chooses the mobile tag at the top of mobile-tag-list as the "current" mobile tag. In step 604, the anchor zone tag sends a Data frame destined for the current mobile tag. In step 606, the current mobile tag responds by sending an Ack frame to the anchor zone tag. In step 608, all zone tags that can detect the Ack frame make TOA measurements of the Ack frame. In step 610, the anchor zone tag verifies if it has sent Data frames to all mobile tags in the mobile-tag-list: if not, then in step 612 the next mobile tag on the mobile-tag-list is chosen as the current mobile tag and the process moves to step 604; if yes, the process moves to step 614 where zone tags send the TOA measurements to the position location server.

Figure 4:
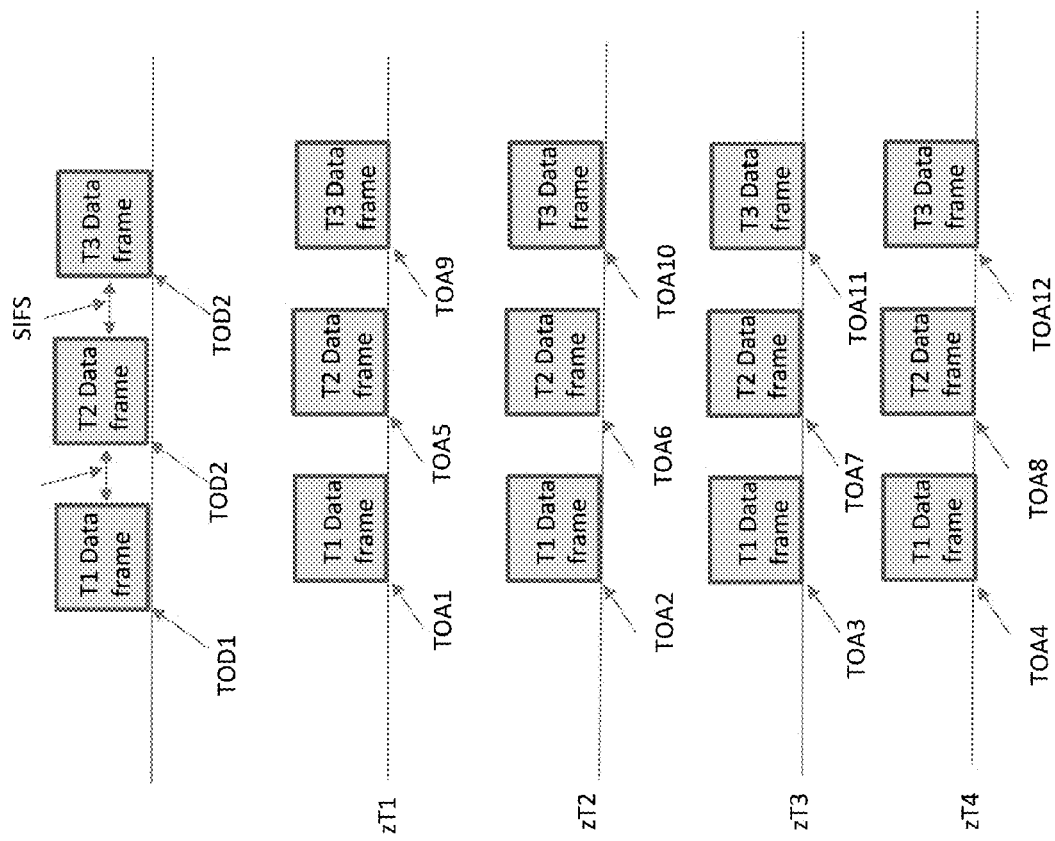
FIG. 4 is an exemplary temporal time line of time of arrival measurements between mobile and zone tags according to an alternate embodiment of the current invention.

In an alternate embodiment, FIG. 4 is a temporal illustration of another embodiment whereby mobile tags transmit Data frames to allow the zone tags to make TOA measurements with mobile tags. In this embodiment, the TOA is measured by zone tags using the received Data frame from mobile tags, encoding a packet frame identifier such as the mobile tab identification number therein in exemplary configuration, without a need for the receiving station to send back an Ack frame. This approach shortens the TOA measurement period. In order to request that the receiver not sent an Ack frame, the mobile tags may send an IEEE 802.11 QoS (Quality of Service) Data frame with the Ack Policy subfield set to No Ack, which will result in the recipient of the QoS Data frame not sending an Ack frame. In exemplary configuration, the position location server employs the packet identifier and time window for grouping frames for TOA calculation.

As illustrated by FIG. 4, mobile tag T1 is assumed to have seized the channel at the beginning of the range-measurement-period, and starts the TOA measurement by sending Data frame 1. As mentioned above, the Data frame will request that no Ack be sent by the recipient station. Zone tags zT1, zT2, zT3 and zT4 that receive Data frame 1, measure the TOA of Data frame 1, TOA1, TROA2, TOA3 and TOA4. Mobile tag T2, i.e. the next mobile tag on the mobile-tag-list, also receives Data frame 1 and, after a time duration of SIFS, sends Data frame 2 to allow zone tags to make TOA measurements on Data frame 2 to be used to estimate the position coordinates of mobile tag 2. This process continues until all mobile tags have send a Data frame, whose TOA is measured at each zone tag. All zone tags send the measured TOA values from each received Data frame to the position location for triangulation to estimate the position of each mobile tag. In other words, mobile tags take turn in sending Data frames during the range-measurement-period. Note that as shown in FIG. 4, the time space between the Data frames sent by mobile tags is chosen to be SIFS or shorter so that other devices in the network do not attempt to access the channel.

Figure 7:
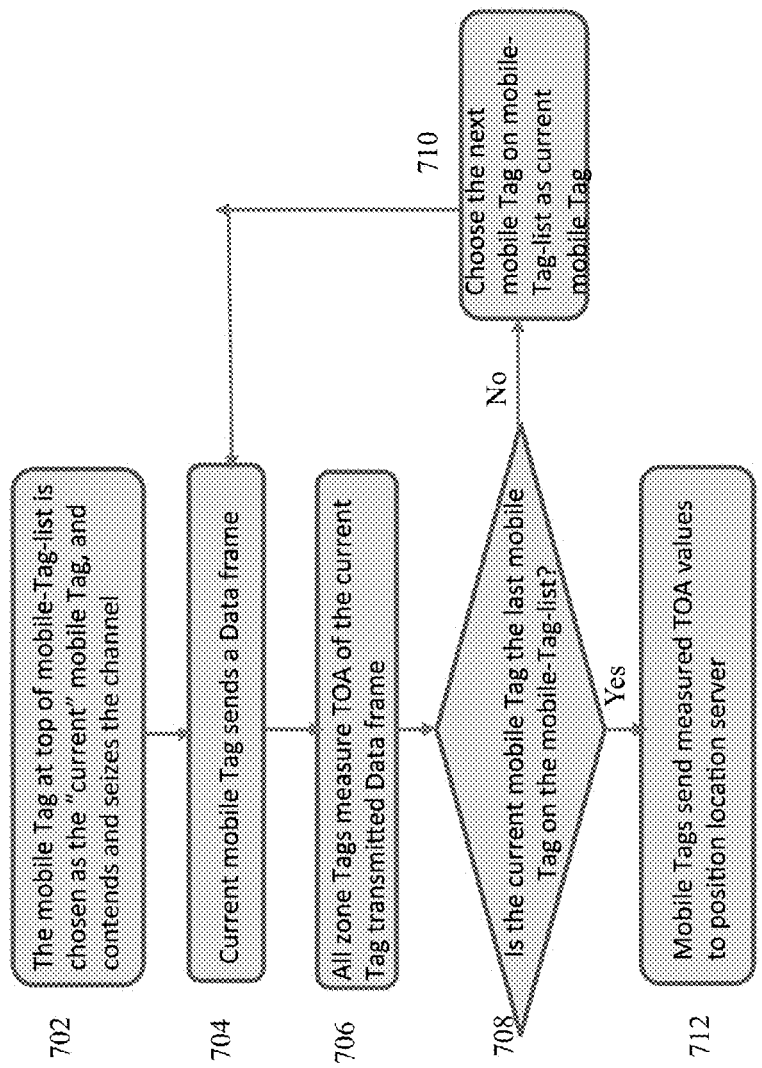
FIG. 7 is an exemplary flow chart of time of arrival measurements between mobile and zone tags according to one embodiment.

FIG. 7 is an exemplary flow chart of an embodiment, whereby mobile tags may initiate and control the TOA measurements with the zone tags. In step 702: the mobile tag at the top of the mobile-tag-list is chosen as the "current" mobile tag; the current mobile tag contends for and seizes the channel. In step 704, the current mobile tag sends Data frame. In step 706, all zone tags that can detect the Data frame sent by the current mobile tag make TOA measurement on the received Data frame. In step 708, the current mobile tag verifies if it is the last mobile tag on the mobile-tag-list: if no, in step 710 the next mobile tag on the mobile-tag-list is chosen as the next current mobile tag and the process moves to step 704; if yes, the process moves to step 712 where the zone tags send their Toa measurements to the position location server.

Mobile tags may also be equipped with sensors such as accelerometer, gyroscope, compass, etc to update the position coordinates of the tag as the asset or the people carrying the mobile tag moves in a venue. The position of the mobile tag needs to be first determined using a scheme such as the triangulation methods based on RTD or TOA measurements between mobile tags and multiple zone tags. Once the mobile tag position is initially determined, then the sensors may update the tag's position. After certain time period, however, the errors in position updates using sensor readings will accumulate and the sensor updated mobile tag position will become inaccurate. Therefore, the position coordinates of the mobile tag need also be periodically refreshed using the triangulation methods based on RTD/TOA measurements. Various embodiments, employ different processes for refreshing range measurement data. In one embodiment, the range measurement based position location update period, referred to as range-measurement-based-positioning-period, is determined adaptively as described next. An initial measurement-based-positioning-period is chosen. The difference between the range measurement based position location estimates and the position location estimates from the sensor updates are computed at the end of each range-measurement-based-positioning-period. If the average, or some other statistical metric, of the difference between the range measurement based position estimate and the sensor based estimates is above a threshold the range-measurement-based-positioning-period interval would be decreased. On the other hand, if average, or some other statistical metric, of the difference between the range measurement based position estimate and the sensor based estimates is below a threshold the range-measurement-based-positioning-period interval would be increased.

Figure 8:
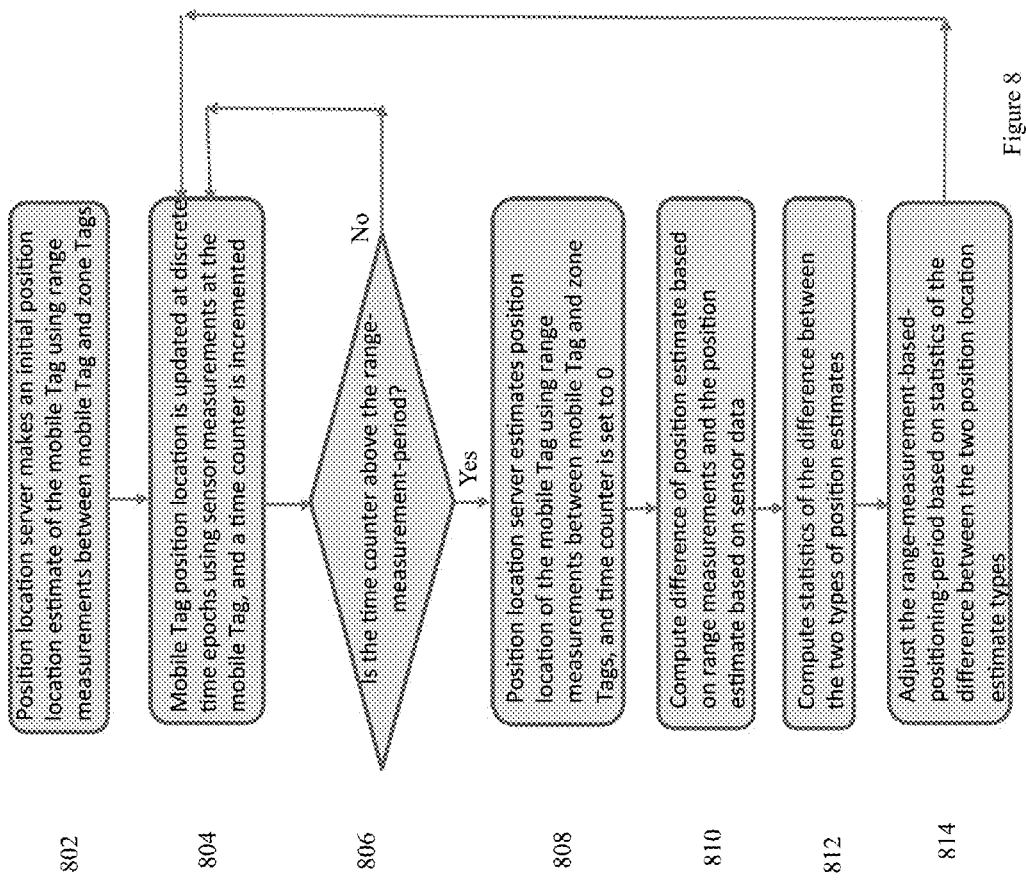
FIG. 8 is an exemplary flow chart of an embodiment to determine the required rate of position location updates of the mobile tags based on range measurements.

FIG. 8 is a flow chart of an embodiment used to determine the required position location updates of the mobile tags based on range measurements for a system that uses sensor measurements to update position location of mobile between range measurement position estimates. In step 802, the position location server makes an initial position location estimate of the mobile tag based on range measurements between mobile and zone tag tags. In step 804, the mobile tag position location is updated at discrete time epochs using sensor readings at the mobile tag, and a time counter is incremented. In step 806, it is verified if the time counter is higher than the range-measurement-based-positioning-period: if no, the process moves back to step 804; if yes, the process moves to step 808. In step 808, a new position location of the mobile tag based on range measurements is made, and the time counter is initialized to 0. In step 810, difference of the sensor based and range measurement based position location estimates is computed. Step 812 computes statistics of the difference between the two types of position location estimates. Step 814, updates the range-measurement-based-positioning-period duration based on the statistics of the difference between the two types of position location estimates.

What is claimed is:

1. A position location determination system comprising:
a first network comprising at least one Access Point (AP) network element, each AP creating a coverage area referred to as a Basic Service Set (BSS), configuring other network elements in its BSS, and providing access to the internet to network elements in its BSS;
a second network of zone tags underlying the first network capable of making range measurements with mobile tags;
time being divided into range-measurement-period intervals, each interval comprising a measurement period when zone tags make range measurements, followed by a sleep period wherein zone tags, mobile tags or both, sleep to save power;
said zone tags and mobile tags waking up at the beginning of range-measurement-period, and an anchor network element contends for the channel and seizes the channel;
mobile tags and zone tags making range measurements according to a schedule; and
the range measurements are used by triangulation algorithms to estimate the position of the mobile tags.

2. The system of claim 1, whereby a zone tag is the anchor network element further comprising:
the anchor zone tag sending a Data frame to each mobile tag, the mobile tags responding with an Acknowledgement frame, and the anchor zone tag estimating the Round Trip Delay (RTD) using Time Of Departure (TOD) of the Data frame and Time Of Arrival (TOA) of the Acknowledgement frame; and
the anchor zone tag designating a second zone tag as the anchor zone tag.

3. The system of claim 2, whereby:
the network elements are IEEE 802.11 enabled devices; and
consecutive Data and Acknowledgement frames are spaced by a short enough inter-frame time interval to prevent other IEEE 802.11 enabled devices from seizing the channel.

4. The system of claim 1, whereby:
a first zone tag is the anchor network element, said anchor network element sending a Data frame to each mobile tag, the mobile tags responding with an Acknowledgement frame, and all zone tags and said anchor network element simultaneously measuring Time Of Arrival (TOA) of the Acknowledgement frame.

5. The system of claim 4, whereby:
the at least one Access Point (AP) network element, the zone tags, and the mobile tags are IEEE 802.11 enabled devices; and consecutive transmitted Data and Acknowledgement frames are spaced by a short enough inter-frame time interval to prevent other IEEE 802.11 enabled devices from seizing the channel.

6. The system of claim 1, whereby a first mobile tag is the anchor network element, the anchor network element sending a Data frame, all zone tags and said anchor network element measuring the Time Of Arrival (TOA) of the Data frame; and
a second mobile tag taking the role of the anchor network element.

7. The system of claim 6, whereby:
the at least one Access Point (AP) network element, the zone tags, and the mobile tags are IEEE 802.11 enabled devices; and consecutive Data frames sent by first and second mobile tags forming first and second anchor network elements are spaced by a short enough inter-frame time interval to prevent other IEEE 802.11 enabled devices from seizing the channel.

8. The system of claim 1, whereby:

the mobile tag position location is periodically estimated by triangulating range measurements between mobile tags and zone tags;

mobile tags contain sensors and apparatus to update the mobile tag position location; and between periodic range measurement based mobile tag position location estimates, the mobile tag sensor readings are used to update the mobile tags' position location.

9. The system of claim 8, whereby:

statistics of the difference of the periodic range measurement based position estimates and the sensor based position updates is computed; and the time between range measurement based position estimate updates is changed based on the computed statistics.

10. The system of claim 9, whereby:

the time between range measurement based position estimate updates is increased if the average, or some other metric, of the differences is below a threshold; and the time between range measurement based position estimate updates is decreased if the average, or some other metric, of the differences is above a threshold.

* * * * *